United States Patent
Toda

(10) Patent No.: US 10,354,366 B2
(45) Date of Patent: Jul. 16, 2019

(54) IMAGE PROCESSING DEVICE, IMAGE PROCESSING METHOD, AND RECORDING MEDIUM

(71) Applicant: NEC Corporation, Minato-ku, Tokyo (JP)

(72) Inventor: Masato Toda, Tokyo (JP)

(73) Assignee: NEC CORPORATION, Tokyo (JP)

(*) Notice: Subject to any disclaimer, the term of this patent is extended or adjusted under 35 U.S.C. 154(b) by 79 days.

(21) Appl. No.: 15/540,330

(22) PCT Filed: Jan. 15, 2016

(86) PCT No.: PCT/JP2016/000210
§ 371 (c)(1),
(2) Date: Jun. 28, 2017

(87) PCT Pub. No.: WO2016/114148
PCT Pub. Date: Jul. 21, 2016

(65) Prior Publication Data
US 2017/0352133 A1  Dec. 7, 2017

(30) Foreign Application Priority Data
Jan. 16, 2015  (JP) ................. 2015-007204

(51) Int. Cl.
*G06T 5/00* (2006.01)
*G06T 5/40* (2006.01)
(Continued)

(52) U.S. Cl.
CPC ............ *G06T 5/002* (2013.01); *G06T 5/40* (2013.01); *G06T 5/50* (2013.01); *H04N 5/332* (2013.01);
(Continued)

(58) Field of Classification Search
CPC ............ C12Q 1/6827; C12Q 2565/125; C12Q 2565/501; G06T 2207/10048; G06T 5/002; G06T 5/40; G06T 5/50; H04N 5/332
See application file for complete search history.

(56) References Cited

U.S. PATENT DOCUMENTS

| | | | |
|---|---|---|---|
| 5,332,899 A | 7/1994 | Wolny et al. | |
| 2012/0043478 A1* | 2/2012 | Iida | G01N 21/645 250/459.1 |
| 2016/0248953 A1* | 8/2016 | Fujita | H04N 5/2256 |

FOREIGN PATENT DOCUMENTS

| | | | |
|---|---|---|---|
| JP | H06-121232 A | 4/1994 | |
| JP | H09-102882 A | 4/1997 | |

(Continued)

OTHER PUBLICATIONS

C. Feng et al., "Near-Infrared Guided Color Image Dehazing" IEEE 20th International Conference on Image Processing (ICIP), Sep. 15-18, 2013, Melbourne, Australia.
(Continued)

*Primary Examiner* — Manuchehr Rahmjoo

(57) ABSTRACT

An image processing device includes: an estimation unit configured to estimate a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region; and a restoration unit configured to multiply an estimated spectral reflectance ratio by luminance of the near infrared image at each pixel position and generate a restored visible light image.

10 Claims, 13 Drawing Sheets

(51) Int. Cl.
*G06T 5/50* (2006.01)
*H04N 5/33* (2006.01)

(52) U.S. Cl.
CPC .............. *G06T 2207/10024* (2013.01); *G06T 2207/10048* (2013.01)

(56) References Cited

FOREIGN PATENT DOCUMENTS

| | | |
|---|---|---|
| JP | 2010-178036 A | 8/2010 |
| JP | 2012-042313 A | 3/2012 |
| JP | 2012-182626 A | 9/2012 |
| JP | 2013-255144 A | 12/2013 |
| JP | 2014-089075 A | 5/2014 |

OTHER PUBLICATIONS

International Search Report for PCT Application No. PCT/JP2016/000210, dated Apr. 5, 2016.
English translation of Written opinion for PCT Application No. PCT/JP2016/000210.

* cited by examiner

IMAGE PROCESSING DEVICE, IMAGE PROCESSING METHOD, AND RECORDING MEDIUM

This application is a National Stage Entry of PCT/JP2016/000210 filed on Jan. 15, 2016, which claims priority from Japanese Patent Application 2015-007204 filed on Jan. 16, 2015, the contents of all of which are incorporated herein by reference, in their entirety.

TECHNICAL FIELD

The disclosed subject matter relates to an image processing device and the like and particularly relates to image processing which uses a near infrared image.

BACKGROUND ART

A visible light image photographed at a time of foggy or hazy weather becomes whiter or has low contrast due to particles existing in the air, and consequently quality of the visible light image is degraded. As illustrated in FIG. 15, under a foggy or hazy environment, reflected light which is reflected from an object of photographing is diffused and attenuated by particles which exist in the air on a path from the object of photographing to a camera. Moreover, at the same time, environmental light is also diffused by the particles existing in the air, and the diffused light reaches an image sensor of the camera. Therefore, light, which the image sensor of the camera receives, is mixed light of the attenuated reflected-light which comes from the object of photographing, and the diffused environmental light. In order to eliminate effects due to the particles existing in the air from the visible light image in which the object of photographing is photographed, it is necessary to eliminate effects of the diffused environmental light from the mixed light, and to restore the reflected light that has been attenuated due to the particles existing in the air.

Until now, a method using information of a near infrared image, in which a transmittance in the foggy or hazy air has a large value and which has a small amount of degradation, is proposed in order to realize restoration to a visible image having no degradation.

Patent literature (PTL) 1 discloses an art that the visible light image is divided into a luminance signal and a color difference signal, and the visible light image is emphasized by combining a near infrared signal with the luminance signal. PTL 2 discloses an art that, by replacing a luminance signal of an object image with a long-wavelength luminance signal in a low chroma area where a difference between a contour part of the long-wavelength luminance signal and a contour part of a visible light luminance signal is equal to or larger than a predetermined value, the visible light image is emphasized.

Each of the arts which are described by PTL 1 and PTL 2 is related to processing of emphasizing the luminance signal, and consequently visibility of the emphasized image becomes improved. However, improvement of image quality regarding color information or the like is not planned.

Meanwhile, the non-patent literature (NPL) 1 is known as image processing for improving the image quality including the color information. NPL 1 uses prior knowledge that, at a time of sunny weather, there is a pixel, in which one of color channels has a null value, around each pixel. At a time of restoration from degradation, performance in restoring the visible light image is improved by imposing restriction that a local gradient of a restored visible light image and a local gradient of the near infrared image are similar each other.

Here, PTL 3 describes an art of spectrophotometric measurement of measuring a fluorescence wavelength band, and a long wavelength band except for the fluorescence wavelength band in a specimen including a fluorescent substance. Moreover, PTL 4 describes an art for coinciding a color of a printed matter, which is observed by reflected light, with a color of a light source which is displayed on a screen. Furthermore, PTL 5 describes an art of converting an infrared image into a visible image or a near infrared image.

CITATION LIST

Patent Literature

[PTL 1]
Japanese Patent Application Laid-Open Publication No. 2013-255144
[PTL 2]
Japanese Patent Application Laid-Open Publication No. 2010-178036
[PTL 3]
Japanese Patent Application Laid-Open Publication No. 2012-042313
[PTL 4]
Japanese Patent Application Laid-Open Publication No. 1997-102882
[PTL 5]
Japanese Patent Application Laid-Open Publication No. 1994-121232

Non-Patent Literature

[NPL 1]
C. Feng, S. Zhuo, X. Zhang, L. Shen and S. Susstrunk, "Near infrared Guided Color Image Dehazing" IEEE 20th International Conference on Image Processing (ICIP), Melbourne, Australia, Sep. 15-18, 2013

SUMMARY OF INVENTION

Technical Problem

The art which is described by NPL 1 carries out processing on the assumption that a ratio of the local gradient of the restored visible light image to the local gradient of the near infrared image is one to one. However, since the ratio of the local gradient of the visible light image to the local gradient of the near infrared image is generally dependent on substance's reflection characteristics, the above-mentioned assumption is not always hold. As a result, excessive emphasis or insufficient restoration from degradation is generated in the restored image which is obtained after processing, and consequently it is difficult to generate the restored image with high level quality.

As mentioned above, it is desirable to provide an image processing device and the like which can eliminate the effects due to the particles existing in the air from the visible light image in which the object of photographing is photographed, and can improve quality of the restored image.

An object of the disclosed subject matter is to provide an image processing device and the like which solve the above-mentioned problem.

Solution to Problem

An image processing device according to one aspect of the disclosed subject matter includes an estimation unit configured to estimate a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region. The image processing device includes a restoration unit configured to multiply an estimated spectral reflectance ratio by luminance of the near infrared image at each pixel position and generate a restored visible light image.

An image processing method includes estimating a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region. An image processing method includes multiplying an estimated spectral reflectance ratio by luminance of the near infrared image at each pixel position and generating a restored visible light image.

A recording medium which stores a program making a computer execute: estimating a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region; and multiplying an estimated spectral reflectance ratio by luminance of the near infrared image at each pixel position and generating a restored visible light image.

Advantageous Effects of Invention

The disclosed subject matter enables to eliminate effects due to particles existing in air from a visible light image in which an object of photographing is photographed, thereby making it possible to improve the quality of a restored image.

DESCRIPTION OF EMBODIMENTS

Hereinafter, example embodiments of the disclosed subject matter will be described with reference to drawings. Here, a direction of arrow in each drawing which describes a configuration according to each example embodiment is mere example, and does not limit the direction of signal between blocks.

First Example Embodiment

Figure 1:
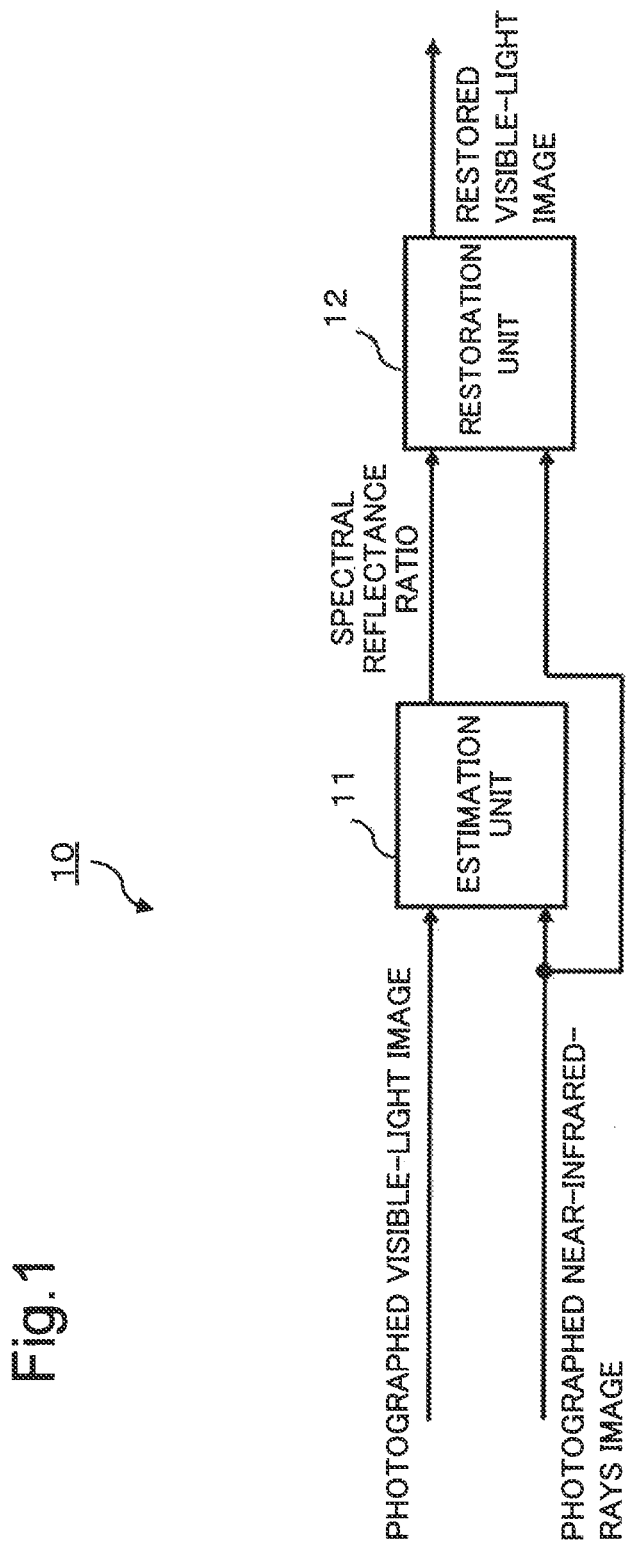
FIG. 1 is a block diagram illustrating a configuration of an image processing device according to a first example embodiment.

An image processing device according to a first example embodiment of the disclosed subject matter will be described in the following in detail with reference to drawings. FIG. 1 is a block diagram illustrating a configuration of the image processing device according to the first example embodiment. The image processing device 10 according to the first example embodiment includes an estimation unit 11 and a restoration unit 12.

The estimation unit 11 receives input of a visible light image (hereinafter, denoted as photographed visible light image) in which an object of photographing is photographed, and a near infrared image (photographed near infrared image) in which the object of photographing is photographed. The estimation unit 11 estimates a spectral reflectance ratio of the object of photographing at each pixel position. The spectral reflectance ratio indicates a ratio of a spectral reflectance of a visible light wavelength region to a spectral reflectance of a near infrared wavelength region.

Figure 15:
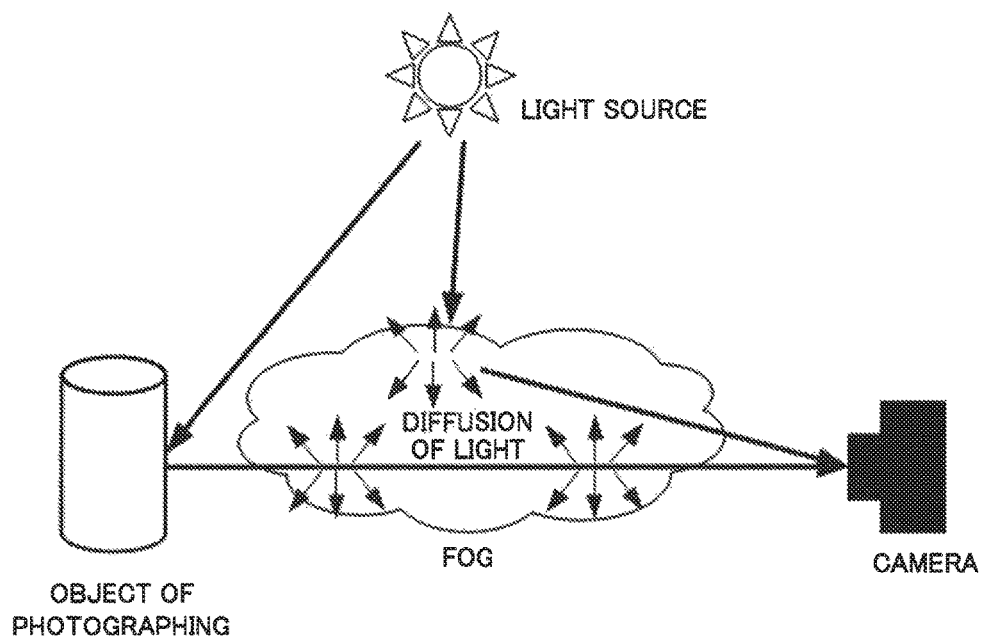
FIG. 15 is a model diagram illustrating a path of light at a time of foggy weather.

Estimation of the spectral reflectance ratio which is carried out by the estimation unit 11 will be described in the following. As illustrated in FIG. 15, under a foggy environment, reflected light from the object of photographing is diffused and attenuated due to particles of fog on a path from the object of photographing to a camera. Moreover, at the same time, environmental light is diffused due to the particles of fog, and this diffused light also reaches an image sensor (not illustrated in the drawing) of the camera. Therefore, light, which the image sensor of the camera receives, is mixed light of the attenuated reflected-light which comes from the object of photographing and the diffused environmental light.

Here, luminance $I_c(x)$ of the visible light, which is observed on a color channel c at a pixel position x of the image sensor of the camera, is expressed as Equation (1) by using luminance $J_c(x)$ of the reflected light on a surface of the object of photographing, and luminance $A_c$ of the environmental light, where t (x) expresses an atmospheric transmittance of the visible light. Here, Equation (1) is based on the fog model which is described in NPL 1.

Similarly, luminance $I_{ir}$ (x) of the near infrared light which is observed at a pixel position x is expressed as Equation (2) by using luminance $J_{ir}$ (x) of the reflected light which is observed at the same pixel position x, luminance Air of the environmental light and an atmospheric transmittance $t_{ir}$ (x) of the near infrared light.

The reflected light $J_c$ (x) of the visible light, and the reflected light $J_{ir}$ (x) of the near infrared light can be expressed as Equation (3) and Equation (4) respectively by using a spectral reflectance $R_c$ (x) and a spectral reflectance $R_{ir}$ (x) of the object of photographing, at the pixel position, and a parameter I (x) which expresses intensity of illumination light from a light source to the object of photographing, and a shadow in the image which is formed by a shape of the object of photographing.

$$I_c(x) = t(x) \cdot J_c(x) + (1 - t(x)) \cdot A_c \quad (1)$$

$$I_{ir}(x) = t_{ir}(x) \cdot J_{ir}(x) + (1 - t_{ir}(x)) \cdot A_{ir} \quad (2)$$

$$J_c(x) = 1(x) \cdot R_c(x) \quad (3)$$

$$J_{ir}(x) = 1(x) \cdot R_{ir}(x) \quad (4)$$

It is known that the atmospheric transmittance of the near infrared light is higher in the fog in comparison with one of the visible light. Therefore, in the case of the first example embodiment, it is assumed that diffusion of the near infrared light in the fog is at negligibly low level.

In the case that the atmospheric transmittance $t_{ir}$ (x) is set to 1.0, the observed near infrared light $I_{ir}$ (x) which is expressed as Equation (2), can be replaced with Equation (5).

$$I_{ir}(x) = J_{ir}(x) \quad (5)$$

Generally, the atmospheric transmittance of light in the air is dependent on a size and density of the particle existing in the air, and a distance to the object of photographing. Moreover, the shadow of the object of photographing in the image is dependent on intensity of illumination light and the shape of the object of photographing. Therefore, the atmospheric transmittance t (x) of the visible light and the parameter I (x), which expresses the shadow, are not correlative each other, and a relation between t (x) and I (x) can be expressed as Equation (6), where a function Coy (·) expresses the covariance.

$$\mathrm{Cov}(t^{-1}, 1) = 0 \quad (6)$$

In the case that the spectral reflectance $R_c$ (x) and the spectral reflectance (x) are constant within the image, a spectral reflectance ratio $\alpha_c$, which is a ratio of $R_c(x)$ to $R_{ir}(x)$, is expressed as Equation (7) by combining Equations (1), (3), (4), (5) and (6).

$$\alpha_c(x) = \frac{R_c(x)}{R_{ir}(x)} = \frac{\mathrm{Cov}\left(I_{ir}(x), \frac{A_c}{A_c - I_c(x)}\right)}{\mathrm{Cov}\left(I_{ir}(x), \frac{I_c(x)}{A_c - I_c(x)}\right)} \quad (7)$$

Figure 13:
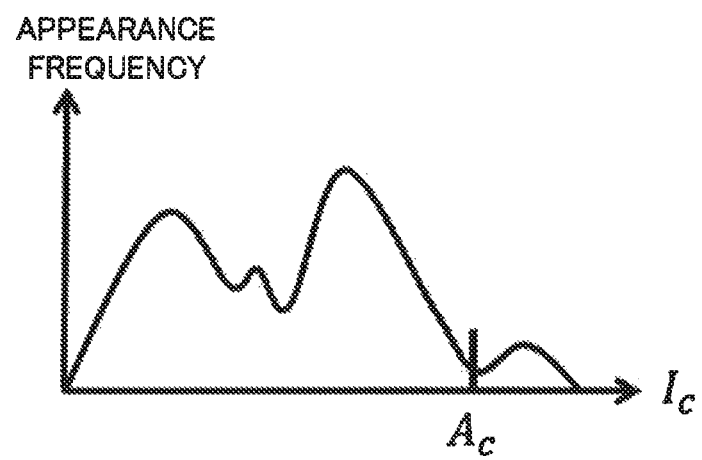
FIG. 13 is a diagram for explaining a method of calculating environmental light.

On the assumption that that the spectral reflectance $R_c$ (x) and the spectral reflectance $R_{ir}$ (x) are constant over an area M×N (each of M and N is an integer) centered around each pixel, the estimation unit 11 estimates a spectral reflectance ratio α (x) at each pixel position by using Equation (7). Here, as a method of calculating the environmental light $A_c$, there is an example in which the calculation is performed based on a relation between luminance in an observed image and the number of pixels having the luminance. For example, a histogram of each color channel of the observed image is made as illustrated in FIG. 13. In a graph illustrated in FIG. 13, the horizontal axis indicates luminance on the color channel, and the vertical axis indicates the number of pixels having the luminance (appearance frequency). In the histogram illustrated in FIG. 13, each number of pixels is accumulated in the order of smallness of the luminance (from the origin side), and when the accumulated value reaches a predetermined value, luminance at this luminance position is denoted as $A_c$. Here, the luminance $A_c$ of the environmental light may be multiplied by a predetermined coefficient, or a limiter may be set for the luminance $A_c$.

The restoration unit 12 receives input of the photographed near infrared image and the spectral reflectance ratio, which is estimated by the estimation unit 11, and generates the restored visible light image. By unifying Equation (3) and Equation (4), a relation between the reflected light in the visible light wavelength region and the reflected light in the near infrared wavelength region is expressed as Equation (8).

$$J_c(x) = \frac{R_c(x)}{R_{ir}(x)} \cdot J_{ir}(x) = \alpha_c(x) \cdot J_{ir}(x) \quad (8)$$

On the basis of the photographed near infrared image, and the spectral reflectance ratio $\alpha_c$ of the spectral reflectance $R_c$ (x) to the spectral reflectance $R_{ir}$ (x), the restoration unit 12 multiplies the estimated spectral reflectance ratio by luminance of the photographed near infrared image at each pixel position by using Equation (8) and generates the restored visible light image.

Figure 2:
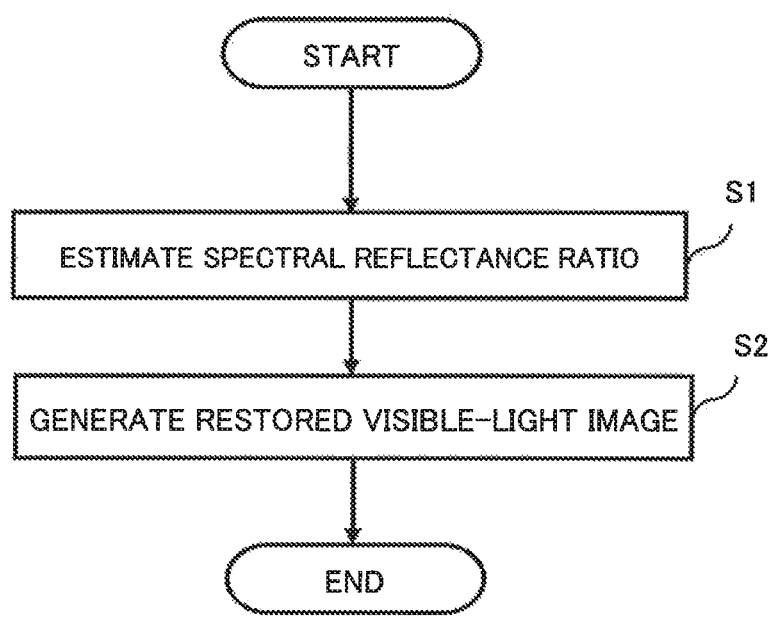
FIG. 2 is a flowchart illustrating an operation of the image processing device according to the first example embodiment.

Next, an operation of the image processing device according to the first example embodiment will be described in the following with reference to drawings. FIG. 2 is a flowchart illustrating the operation of the image processing device according to the first example embodiment.

The estimation unit 11 receives input of the photographed visible light image and the photographed near infrared image. The estimation unit 11 estimates the spectral reflectance ratio ratio of the object of photographing at each pixel position (S1). The spectral reflectance ratio indicates the ratio of the spectral reflectance of the visible light wavelength region to the spectral reflectance of the near infrared wavelength region.

The restoration unit 12 generates the restored visible light image on the basis of the photographed near infrared image and the spectral reflectance ratio which is estimated by the estimation unit 11 (S2).

Effect of First Example Embodiment

The image processing device 10 according to the first exemplary embodiment can eliminate the effects due to the particles existing in the air from the visible light image in which the object of photographing is photographed, and can improve quality of the restored image. The reason is that the spectral reflectance ratio of the object of photographing at each pixel position is estimated, where the spectral reflectance ratio indicates the ratio of the spectral reflectance of the visible light wavelength region to the spectral reflectance of the near infrared wavelength region, and that the restored visible light image is generated on the basis of the spectral reflectance ratio, which is estimated at each pixel position, and the photographed near infrared image.

Second Example Embodiment

Next, an image processing device according to a second exemplary embodiment of the disclosed subject matter will be described with reference to drawings.

Figure 3:
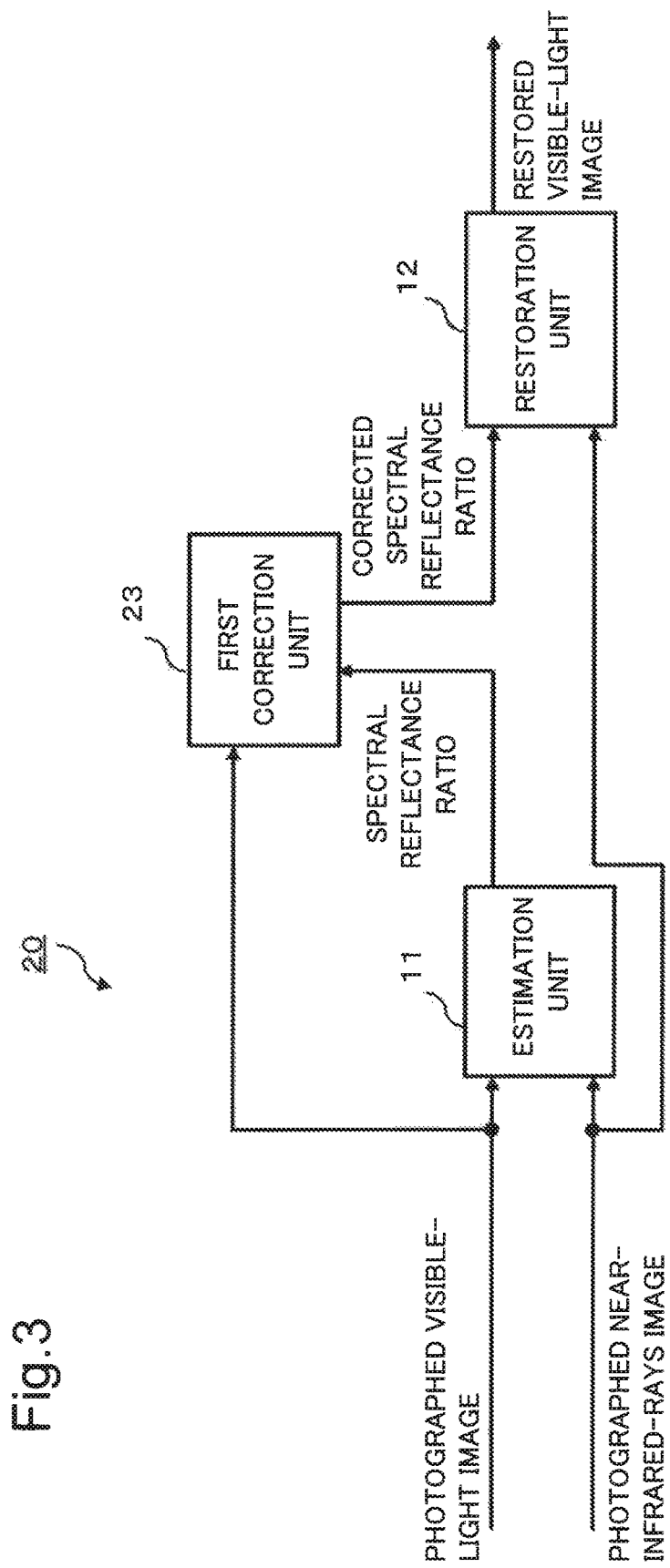
FIG. 3 is a block diagram illustrating a configuration of an image processing device according to a second example embodiment.

FIG. 3 is a block diagram illustrating a configuration of the image processing device according to the second example embodiment of the disclosed subject matter. The image processing device 20 according to the second example embodiment includes the estimation unit 11, the restoration unit 12 and a first correction unit 23. The image processing device 20 according to the second example embodiment is different from the image processing device 10 according to the first example embodiment in a point of including the first correction unit 23. Hereinafter, the second example embodiment is described, focusing mainly on different elements, and elements similar to those in the first example embodiment are denoted by the same reference numerals and detailed descriptions thereof are omitted.

The first correction unit 23 of the image processing device 20 receives input of a visible light image (photographed visible light image) which is photographed, and the spectral reflectance ratio which is estimated by the estimation unit 11. Next, the first correction unit 23 estimates a spectral reflectance ratio (hereinafter, denoted as corrected spectral reflectance ratio) by correcting the spectral reflectance ratio at each pixel of interest of the object of photographing by use of information of the photographed visible light image and the spectral reflectance ratio in a neighborhood around the pixel of interest.

The estimation unit 11 estimates the spectral reflectance ratio by using Equation (7) on the assumption that the spectral reflectance is constant in the neighborhood centered around the pixel. However, in practice, there is a case that the assumption does not hold depending on texture of the object of photographing, a boundary between the objects of photographing or the like. In this case, there may be an error in estimating the spectral reflectance ratio by using Equation (7), and a restoration process carried out by the restoration unit 12 may fail. Therefore, the first correction unit 23 extracts pixel groups from the neighborhoods around the pixel of interest, which can be regarded as the same region, by using the information of the visible light image, and corrects the spectral reflectance ratio of the pixel of interest on the basis of the spectral reflectance ratios of the pixel groups.

As a method of correcting the spectral reflectance ratio, there is a method of smoothing the spectral reflectance ratio by using a composite weight on the basis of color information of the visible light image. As a method of calculating the composite weight, there is a method using the hue H of the HSV color system in each pixel of the visible light image. The composite weight w (x, y) at a pixel position y of the neighborhood pixel for the spectral reflectance ratio of the pixel of interest at a pixel position x is calculated on the basis of Equation (10) by using a distance d (x, y) between the hues which is expressed as Equation (9), where each of H (x) and H (y) is the hue H in the HSV color system, and σH2 is a preset parameter.

$$d(x, y) = \min(|H(x) - H(y)|, 2\pi - |H(x) - H(y)|) \quad (9)$$

$$w(x, y) = \exp\left(-\frac{d^2(x, y)}{\sigma_H^2}\right) \quad (10)$$

The first correction unit 23 calculates the composite weight for each of the predetermined neighborhood pixels including the pixel of interest, and calculates a corrected spectral reflectance ratio α' (x) by combining a spectral reflectance ratio α (y) of the neighborhood pixel using $$\alpha'(x) = \frac{\sum_{\forall y} w(x, y) \cdot \alpha(y)}{\sum_{\forall y} w(x, y)} \quad (11)$$

Here, the first correction unit 23 may use the hue h of the L*C*h color system for calculating the distance between the hues on the basis of Equation (9). Alternatively, an angle θ formed between a line from the origin to a color position of the pixel of interest with a line from the origin to a color position of the neighborhood pixel in the u-v plane of the yuv color system may be used for calculation of the distance between the hues. Moreover, another function, which has characteristics of outputting a large value as the distance d (x, y) becomes short, and outputting a small value as the distance d (x, y) becomes long, may be used for calculating the composite weight on the basis of Equation (10). Alternatively, a method of reading the composite weight, which is related to the distance d (x, y), from a table which holds the composite weight related to the distance between the hues and which is set in manual beforehand may be used for calculating the composite weight.

The restoration unit 12 of the image processing device 20 receives input of the photographed near infrared image and the corrected spectral reflectance ratio which is provided by the first correction unit 23 and generates the restored visible light image. In the generation process which is carried out by the restoration unit 12, the input into the restoration unit 12 is changed from the spectral reflectance ratio to the corrected spectral reflectance ratio.

Figure 4:
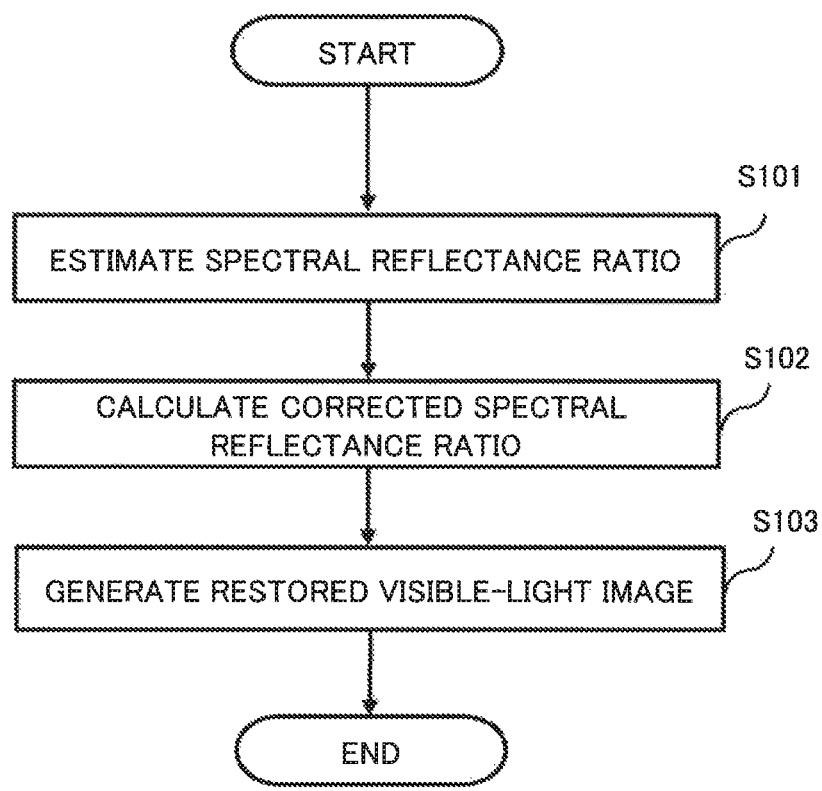
FIG. 4 is a flowchart illustrating an operation of the image processing device according to the second example embodiment.

Next, an operation of the image processing device according to the second example embodiment will be described with reference to drawings. FIG. 4 is a flowchart illustrating the operation of the image processing device according to the second example embodiment.

The estimation unit 11 of the image processing device 20 receives input of the photographed visible light image and the photographed near infrared image. The estimation unit 11 estimates the spectral reflectance ratio indicating the ratio of the spectral reflectance of the visible light wavelength region to the spectral reflectance of the near infrared wavelength region, which is related to the object of photographing, at each pixel position (S101). The first correction unit 23 of the image processing device 20 receives input of the photographed visible light image and the spectral reflectance ratio which is estimated by the estimation unit 11. The first correction unit 23 corrects the spectral reflectance ratio in each pixel of interest by using the information of the photographed visible light image and the spectral reflectance ratio in a neighborhood of the pixel of interest, and calculates the corrected spectral reflectance ratio (S102).

The restoration unit 12 of the image processing device 20 receives input of the photographed near infrared image and the corrected spectral reflectance ratio, which is corrected by the first correction unit 23, and generates the restored visible light image (S103).

Effect of Second Example Embodiment

As in the image processing device 10 according to the first example embodiment, the image processing device 20 according to the second example embodiment can eliminate the effects due to the particles existing in the air from the visible light image in which the object of photographing is photographed, and can improve quality of the restored image.

Furthermore, the image processing device 20 according to the second example embodiment can reduce cases of failure in restoring the visible light image, which are due to texture of the object of photographing, existence of a boundary between the objects of photographing, or the like. The reason is that the first correction unit 23 calculates the pixel groups in the neighborhoods of the pixel of interest, which can be regarded as the same region, by using the information of the visible light image, and corrects the spectral reflectance ratio of the pixel of interest on the basis of the spectral reflectance ratios of the pixel groups.

Third Example Embodiment

Next, an image processing device according to a third example embodiment of the disclosed subject matter will be described with reference to drawings.

Figure 5:
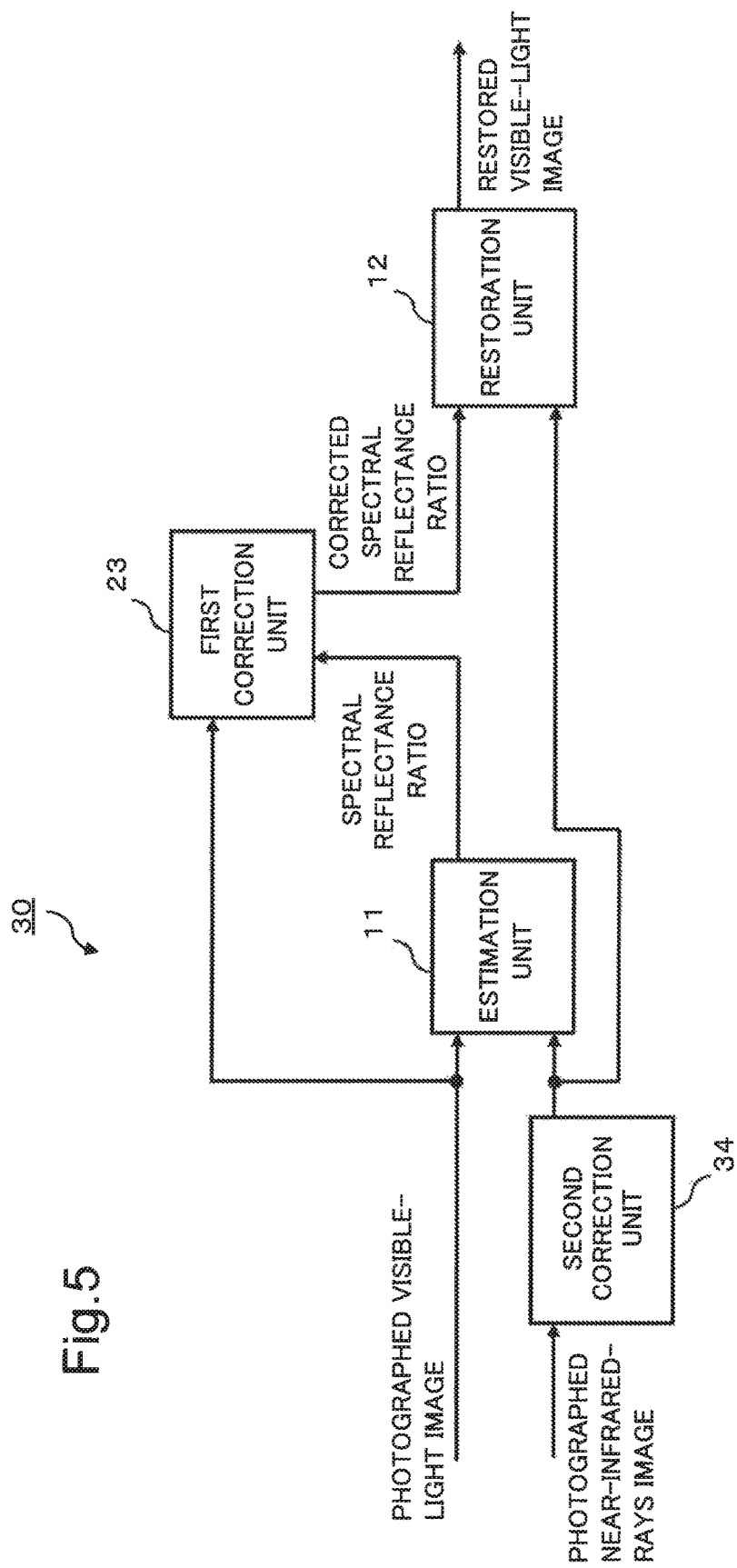
FIG. 5 is a block diagram illustrating a configuration of an image processing device according to a third example embodiment.

FIG. 5 is a block diagram illustrating a configuration of the image processing device according to the third example embodiment of the disclosed subject matter. The image processing device 30 according to the third example embodiment includes the estimation unit 11, the restoration unit 12, the first correction unit 23 and a second correction unit 34. The image processing device 30 according to the third example embodiment is different from the image processing device 20 according to the second example embodiment in a point of including the second correction unit 34. Hereinafter, the third example embodiment is described, focusing mainly on different elements, and elements similar to those in the second example embodiment are denoted by the same reference numerals and detailed descriptions thereof are omitted.

The second correction unit 34 receives input of the photographed near infrared image, estimates an atmospheric transmittance, which is due to the particles existing in the air, in each pixel of the photographed near infrared image, reduces degradation of the photographed near infrared image, and generates a photographed near infrared image (hereinafter, denoted as corrected near infrared image) which is corrected.

In the case of the first example embodiment and the second example embodiment, the atmospheric transmittance $t_{ir}(x)$ of the near infrared light in Equation (2) is set to 1.0 on the assumption that degradation in the photographed near infrared image due to the fog can be neglected, and then processing is carried out. However, in practice, there may be a case where the degradation is not negligibly small. Therefore, the second correction unit 34 estimates the atmospheric transmittance $t_{ir}(x)$ in each pixel of the photographed near infrared image, and reduces degradation due to the effects of the particles existing in the air.

As a method of estimating the atmospheric transmittance $t_{ir}(x)$ of the near infrared light, there is a method which uses the prior knowledge that a pixel having a null value exists in a neighborhood of each pixel at a time of sunny weather. A minimum pixel value $p_{ir}(x)$ for each of the pixel positions y of the neighborhood pixels including the pixel of interest existing at the pixel position x can be calculated by using Equation (12).

$$p_{ir}(x) = \min_{\forall y}(I_{ir}(y)) \tag{12}$$

Considering that the calculated minimum pixel value is due to effects of the environmental light which is diffused by the particles existing in the air, the atmospheric transmittance $t_{ir}(x)$ in the pixel of interest is expressed as Equation (13).

$$t_{ir}(x) = 1 - \frac{p_{ir}(x)}{A_{ir}} \tag{13}$$

Therefore, the reflected light $J_{ir}(x)$ in the near infrared region at the pixel position x can be calculated by using Equation (14). Here, $I_{ir}(x)$ and $A_{ir}$ indicate the observed near infrared light and the environmental light (near infrared light) respectively.

$$J_{ir}(x) = \frac{1}{t_{ir}(x)}(I_{ir}(x) - (1 - t_{ir}(x)) \cdot A_{ir}) \tag{14}$$

The second correction unit 34 calculates the reflected light $J_{ir}(x)$ in each pixel by using Equation (14), and outputs the calculated reflected-light as the corrected near infrared image. Here, when calculating the atmospheric transmittance expressed by Equation (13), the second correction unit 34 may set an upper limit value to the minimum pixel value $p_{ir}(x)$. Alternatively, the second correction unit 34 may carry out correction such as multiplication of a preset coefficient or the like. Moreover, the atmospheric transmittance $t_{ir}(x)$ may be corrected by using luminance of the near infrared image in the neighborhood of the pixel of interest, or the calculated value of the atmospheric transmittance. For example, the composite weight $w_{ir}(x, y)$ at the pixel position y of the neighborhood pixel for the pixel of interest existing at the pixel position x is calculated by using Equation (15), and a value of the atmospheric transmittance of the pixel of interest can be corrected by combining the calculated value of the atmospheric transmittance of the neighborhood pixel on the basis of Equation (16), where $\sigma_{ir}^2$ is a preset parameter.

$$w_{ir}(x, y) = \exp\left(-\frac{(I_{ir}(x) - I_{ir}(y))}{\sigma_{ir}^2}\right) \tag{15}$$

$$\alpha'(x) = \frac{\sum_{\forall y} w_{ir}(x, y) \cdot \alpha(y)}{\sum_{\forall y} w_{ir}(x, y)} \tag{16}$$

The estimation unit 11 of the image processing device 30 receives input of the photographed visible light image and the corrected near infrared image, which is provided by the second correction unit 34, and estimates the spectral reflectance ratio. In the estimation process which is carried out by the estimation unit 11 of the image processing device 30, a part of the inputs into the estimation unit 11 is changed from the photographed near infrared image to the corrected near infrared image.

The restoration unit 12 of the image processing device 30 receives input of the corrected spectral reflectance ratio which is provided by the first correction unit 23 and the corrected near infrared image which is provided by the second correction unit 34, and generates the restored visible light image. In the generation process which is carried out by the restoration unit 12 of the image processing device 30, a part of the inputs into the restoration unit 12 is changed from the photographed near infrared image to the corrected near infrared image.

Figure 6:
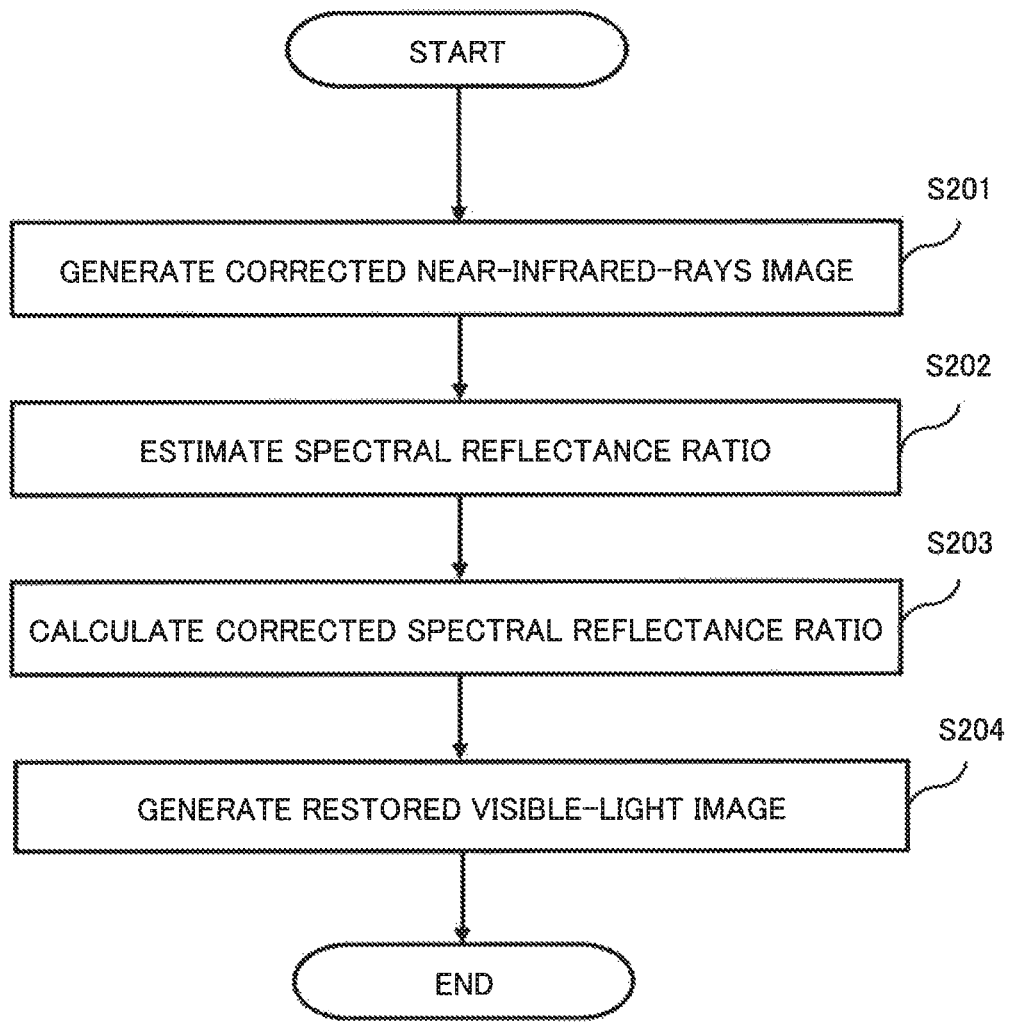
FIG. 6 is a flowchart illustrating an operation of the image processing device according to the third example embodiment.

Next, an operation of the image processing device according to the third example embodiment will be described with reference to drawings. FIG. 6 is a flowchart illustrating the operation of the image processing device according to the third example embodiment.

Firstly, the second correction unit 34 of the image processing device 30 receives input of the photographed near infrared image. The second correction unit 34 estimates, the atmospheric transmittance, which is due to the particles existing in the air, in the photographed near infrared image, corrects the photographed near infrared image by reducing the degradation, and generates the corrected near infrared image (S201).

The estimation unit 11 of the image processing device 30 receives input of the photographed visible light image, and the corrected near infrared image which is provided by the second correction unit 34. The estimation unit 11 estimates the spectral reflectance ratio of the object of photographing at each pixel position (S202). The spectral reflectance ratio is a ratio of the spectral reflectance of the visible light wavelength region to the spectral reflectance of the near infrared light wavelength region.

The first correction unit 23 of the image processing device 30 receives input of the photographed visible light image and the spectral reflectance ratio which is provided by the estimation unit 11. The first correction unit 23 corrects the spectral reflectance ratio in each pixel of interest by using the information of the photographed visible light image and the spectral reflectance ratio in the neighborhood of the pixel of interest, and calculates the corrected spectral reflectance ratio (S203).

The restoration unit 12 of the image processing device 30 receives input of the corrected near infrared image which is provided by the second correction unit 34 and the corrected spectral reflectance ratio which is provided by the first correction unit 23, and generates the restored visible light image (S204).

Effect of Third Example Embodiment

As in the image processing device 20 according to the second example embodiment, the image processing device 30 according to the third example embodiment can eliminate the effects due to the particles existing in the air from the visible light image in which the object of photographing is photographed, and can improve quality of the restored image.

Furthermore, the image processing device 30 according to the third example embodiment can reduce cases of failure in restoring the visible light image, which are due to texture of the object of photographing, existence of a boundary between the objects of photographing, or the like.

Furthermore, the image processing device 30 according to the third example embodiment can generate the restored image with high level quality in comparison with the second example embodiment. The reason is that the second correction unit 34 calculates the atmospheric transmittance in each pixel of the near infrared image, and carries out correction to reduce degradation, which is due to the particles existing in the air, in the near infrared image.

Modification of Third Example Embodiment

Figure 7:
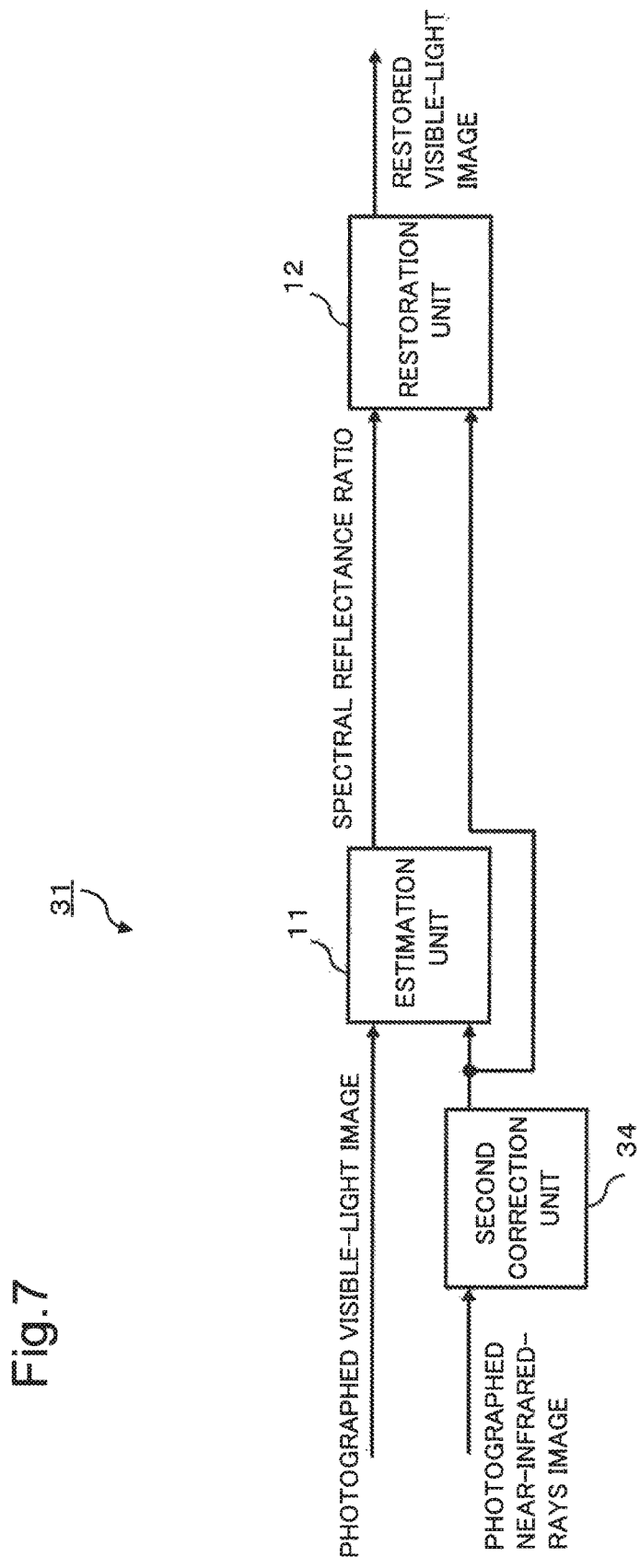
FIG. 7 is a block diagram illustrating a modification of the configuration of the image processing device according to the third example embodiment.

Next, a modification of the third example embodiment will be described. The image processing device 30 according to the third example embodiment is corresponding to the case that the second correction unit 34 is mounted on the image processing device 20 according to the second example embodiment. Alternatively, the second correction unit 34 may be mounted on the image processing device 10 according to the first example embodiment. FIG. 7 is a block diagram illustrating a configuration of an image processing device 31 which is the modification of the third example embodiment. The image processing device 31 illustrated in FIG. 7 includes the estimation unit 11, the restoration unit 12, and the second correction unit 34.

The second correction unit 34 of the image processing device 31 receives input of the photographed near infrared image. The second correction unit 34 estimates the atmospheric transmittance, which is due to the particles existing in the air, in the photographed near infrared image, and generates the near infrared image (hereinafter, denoted as corrected near infrared image) by correcting the photographed near infrared image so as to reduce the degradation. The correction process for correcting the near infrared image, which is carried out by the second correction unit 34 of the image processing device 31, is similar to the correction process which is carried out by the second correction unit 34 of the image processing device 30 according to the third example embodiment.

The estimation unit 11 of the image processing device 31 receives input of the photographed visible light image and the corrected near infrared image which is provided by the second correction unit 34, and estimates the spectral reflectance ratio. The estimation process which is carried out by the estimation unit 11 of the image processing device 31 is similar to the estimation process which is carried out by the estimation unit 11 of the image processing device 30.

The restoration unit 12 of the image processing device 31 receives input of the spectral reflectance ratio which is provided by the estimation unit 11 and the corrected near infrared image which is corrected by the second correction unit 34, and generates the restored visible light image. In the generation process which is carried out by the restoration unit 12 of the image processing device 31, a part of the inputs into the restoration unit 12 is changed from the photographed near infrared image to the corrected near infrared image.

Figure 8:
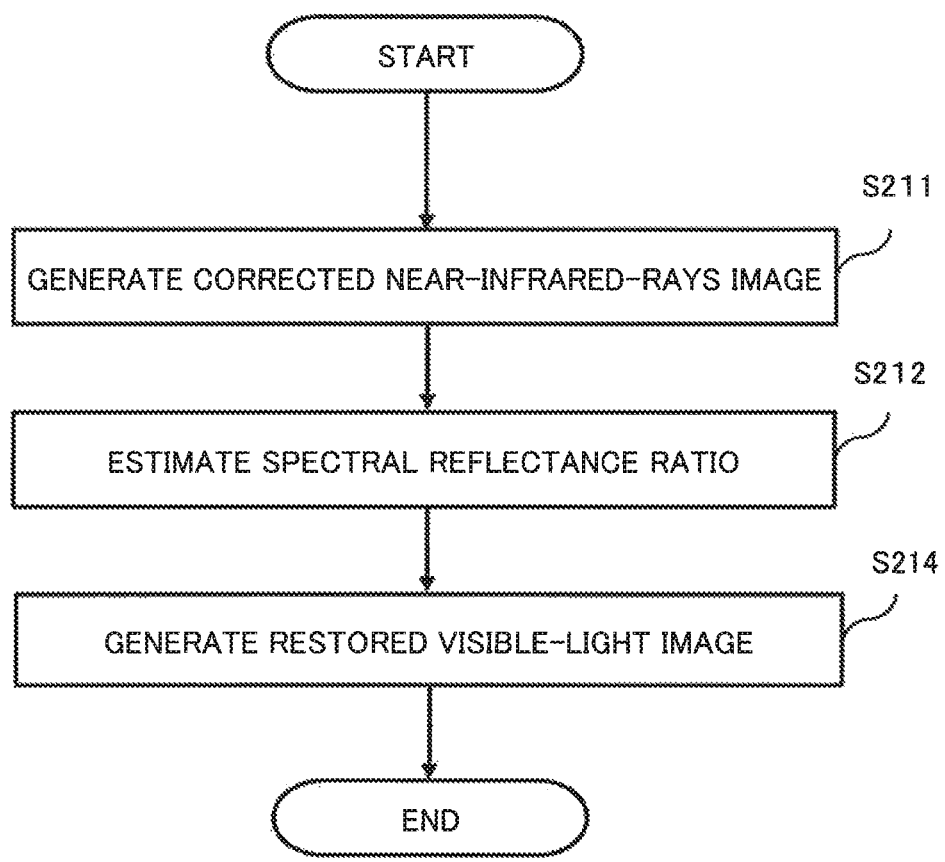
FIG. 8 is a flowchart illustrating an operation of the modification of the image processing device according to the third example embodiment.

FIG. 8 is a flowchart illustrating an operation of the image processing device according to the modification of the third example embodiment.

Firstly, the second correction unit 34 of the image processing device 31 receives input of the photographed near infrared image, estimates the atmospheric transmittance, which is due to the particles existing in the air, in the photographed near infrared image, corrects the photographed near infrared image by reducing the degradation, and generates the corrected near infrared image (S211).

The estimation unit 11 of the image processing device 30 receives input of the photographed visible light image, and the corrected near infrared image which is provided by the second correction unit 34. The estimation unit 11 estimates the spectral reflectance ratio of the object of photographing at each pixel position (S212). The spectral reflectance ratio is a ratio of the spectral reflectance of the visible light wavelength region to the spectral reflectance of the near infrared light wavelength region.

The restoration unit 12 of the image processing device 30 receives input of the corrected near infrared image which is provided by the second correction unit 34 and the spectral reflectance ratio which is provided by the estimation unit 11, and generates the restored visible light image (S214).

Effect of Modification of Third Example Embodiment

As in the image processing device 10 according to the first example embodiment, the image processing device 31, which is the modification of the third example embodiment, can eliminate the effects due to the particles existing in the air from the visible light image in which the object of photographing is photographed, and can improve quality of the restored image.

Furthermore, the image processing device 31 can eliminate the effects due to the particles existing in the air from the near infrared image, and can generate the restored image with high level quality in comparison with the first example embodiment of the restored visible-image. The reason is that the second correction unit 34 estimates the atmospheric transmittance in each pixel of the near infrared image, and carries out correction which reduces the degradation due to the effects of the particles existing in the air.

Fourth Example Embodiment

Next, an image processing device according to a fourth example embodiment of the disclosed subject matter will be described with reference to drawings.

Figure 9:
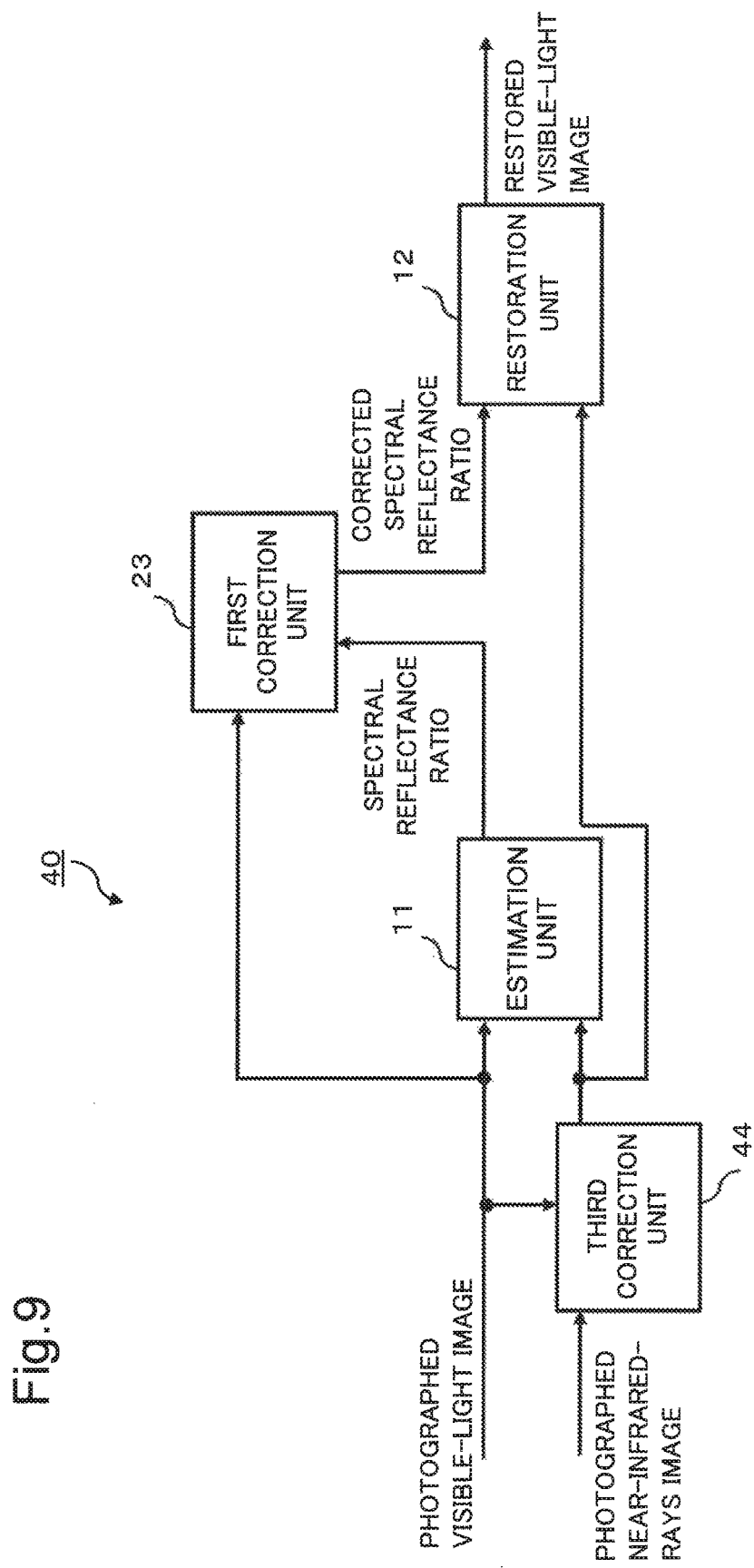
FIG. 9 is a block diagram illustrating a configuration of an image processing device according to a fourth example embodiment.

FIG. 9 is a block diagram illustrating a configuration of the image processing device according to the fourth example embodiment of the disclosed subject matter. The image processing device 40 according to the fourth example embodiment includes the estimation unit 11, the restoration unit 12, the first correction unit 23 and a third correction unit 44. The image processing device 40 according to the fourth example embodiment is different from the image processing device 30 according to the third example embodiment in a point that the third correction unit 44 is used in place of the second correction unit 34. The third correction unit 44 is different from the second correction unit 34 in a point of using the photographed visible light image in order to eliminate the effects of the particles existing in the air from the near infrared image in which the object of photographing is photographed. Hereinafter, the fourth example embodiment is described, focusing mainly on different elements, and elements similar to those in the third example embodiment are denoted by the same reference numerals and detailed descriptions thereof are omitted.

The third correction unit 44 receives input of the photographed visible light image and the photographed near infrared image, estimates the atmospheric transmittance, which is due to the particles existing in the air, in the photographed near infrared image, and generates the corrected near infrared image in which the degradation of the photographed near infrared image is reduced. The third correction unit 44 improves accuracy in estimating the atmospheric transmittance $t_{ir}(x)$ of the near infrared light by using the information of the photographed visible light image as an additional input. As a method which uses the information of the photographed visible light image, there is a method which uses estimation of the atmospheric transmittance of the visible light. It is known that, generally, the atmospheric transmittance of the near infrared light is higher than the atmospheric transmittance of the visible light. Therefore, in the case that the atmospheric transmittance of the near infrared light has a smaller value than the atmospheric transmittance of the visible light has, it is predicted that there is some kind of estimation error. Therefore, the third correction unit 44 uses the prior knowledge that, at a time of sunny weather, there is a pixel, in which one of color channels has a null value, around each pixel. The third correction unit 44 improves correction performance of the near infrared light on the basis of Equation (14) by estimating the atmospheric transmittance of the visible light and modifying the atmospheric transmittance of the near infrared light which is calculated by using Equation (12) and Equation (13).

As an example of a method for estimating the atmospheric transmittance $t_v(x)$ of the visible light, there is a method which uses the minimum value of luminance out of values of luminance of the neighborhood pixels like Equation (18). Equation (18) expresses a method to estimate the atmospheric transmittance $t_v(x)$ of the visible light by finding a minimum value of a ratio of luminance of the color channel to luminance of the environmental light for each color channel at a certain neighborhood pixel position y, and furthermore finding a minimum value of the found minimum values of the ratio for all the neighborhood pixels y.

$$t_v(x) = 1 - \min_{\forall y}\left(\min_{\forall c}\left(\frac{I_c(y)}{A_c}\right)\right) \quad (18)$$

Modification of the atmospheric transmittance of the near infrared light is carried out by selecting one atmospheric transmittance having a not-smaller value out of the atmospheric transmittance $t_{ir}(x)$ of the near infrared light which is calculated by using Equation (12) and Equation (13), and the atmospheric transmittance $t_v(x)$ of the visible light by use of Equation (19).

$$t'_{ir}(x) = \max(t_{ir}(x), t_v(x)) \quad (19)$$

Here, the third correction unit 44 may set a lower limit value of the calculated atmospheric transmittance $t_v(x)$ of the visible light in advance, and may correct the atmospheric transmittance $t_v(x)$ in such a way that the atmospheric transmittance $t_v(x)$ may not become smaller than the lower limit value. Moreover, the third correction unit 44 may carry out correction by multiplying the calculated atmospheric transmittance $t_v(x)$ of the visible light by a predetermined coefficient, or by carrying out an exponentiation process using a preset exponent.

In the case of the image processing device 40 according to the fourth example embodiment, the third correction unit 44 is used in place of the second correction unit 34 of the image processing device 30 according to the third example embodiment. Therefore, the estimation unit 11 of the image processing device 40 receives input of the photographed visible light image and the corrected near infrared image which is provided by the third correction unit 44, and estimates the spectral reflectance ratio. In the estimation process which is carried out by the estimation unit 11 of the image processing device 40, a part of the inputs into the estimation unit 11 is changed to the corrected near infrared image in which the information of the photographed visible light image is taken into consideration.

Moreover, the restoration unit 12 of the image processing device 40 receives input of the corrected spectral reflectance ratio which is provided by the first correction unit 23 and the corrected near infrared image which is provided by the third correction unit 44, and generates the restored visible light image. In the generation process which is carried out by the restoration unit 12 of the image processing device 40, a part of the inputs into the restoration unit 12 of the image processing device 30 according to the third example embodiment is changed to the corrected near infrared image in which the information of the photographed visible light image is taken into consideration.

Figure 10:
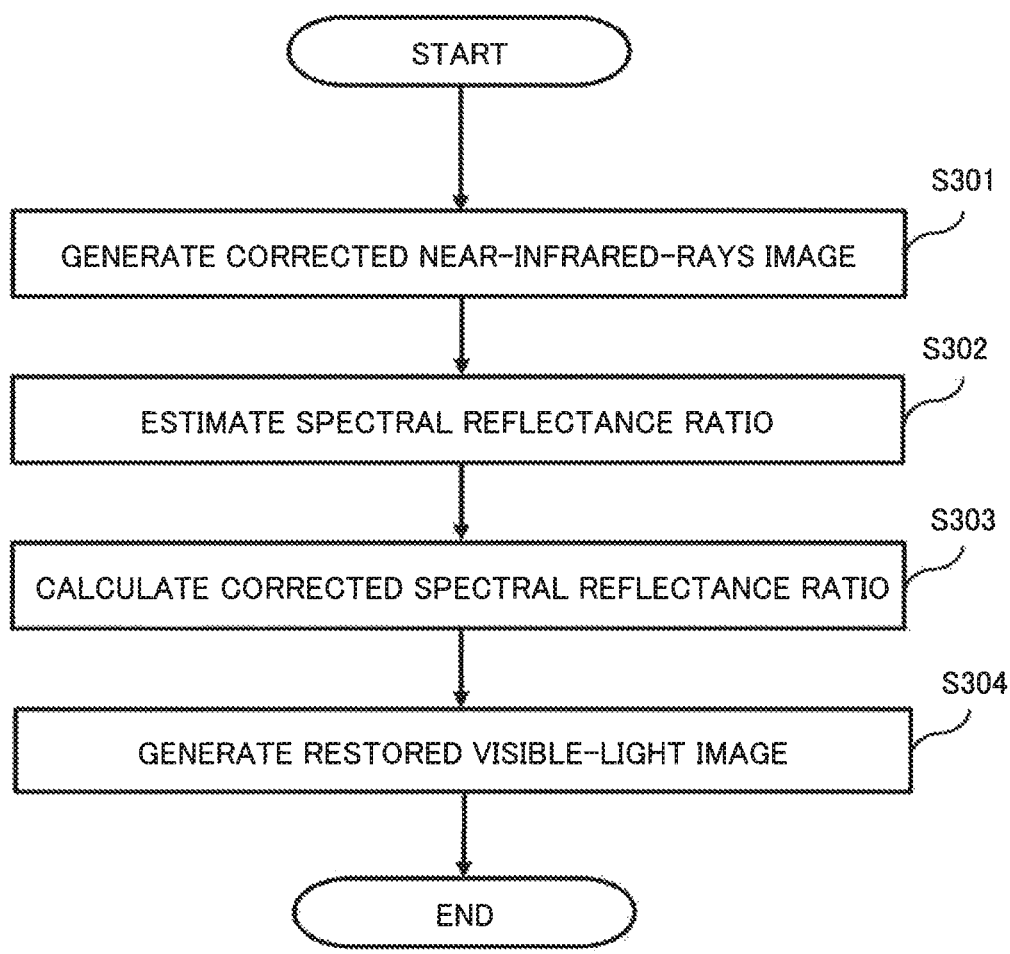
FIG. 10 is a flowchart illustrating an operation of the image processing device according to the fourth example embodiment.

Next, an operation of the image processing device according to the fourth example embodiment will be described with reference to drawings. FIG. 10 is a flowchart illustrating the operation of the image processing device according to the fourth example embodiment.

The third correction unit 44 of the image processing device 40 receives input of the photographed visible light image and the photographed near infrared image. The third correction unit 44 calculates the atmospheric transmittance, which is due to the particles existing in the air, in the photographed near infrared image, carries out correction, which reduces degradation of the photographed near infrared image, and generates the corrected near infrared image (S301).

The estimation unit 11 of the image processing device 40 receives input of the photographed visible light image and the corrected near infrared image, and estimates the spectral reflectance ratio of the spectral reflectance of the visible light wavelength region to the spectral reflectance of the near infrared light wavelength region, which is related to the object of photographing, at each pixel position (S302).

The first correction unit 23 of the image processing device 40 receives input of the photographed visible light image and the spectral reflectance ratio which is provided by the estimation unit 11. The first correction unit 23 corrects the spectral reflectance ratio in each pixel of interest by using the information of the photographed visible light image and the spectral reflectance ratio in the neighborhood of the pixel of interest, and calculates the corrected spectral reflectance ratio (S303).

The restoration unit 12 of the image processing device 40 receives input of the corrected near infrared image which is provided by the third correction unit 44, the corrected spectral reflectance ratio, which is provided by the first correction unit 23, and generates the restored visible light image (S304).

Effect of Fourth Example Embodiment

As in the image processing device 10 according to the first example embodiment, the image processing device 40 according to the fourth example embodiment can eliminate the effects due to the particles existing in the air from the visible light image in which the object of photographing is photographed, and can generate the restored image with high level quality.

Furthermore, the image processing device 40 can reduce cases of failure in restoring the visible light image, which are due to texture of the object of photographing, existence of a boundary between the objects of photographing, or the like.

Furthermore, the image processing device 40 can eliminate the effects due to the particles existing in the air from the near infrared image, and can generate the restored image with high level quality in comparison with the third example embodiment of the restored visible light image.

The reason is that the third correction unit 44 estimates the atmospheric transmittance in each pixel of the near infrared image, carries out correction which reduces the degradation due to the particles existing in the air, and uses the information of the photographed visible light image during these processes, thereby making it possible to improve accuracy in estimating the atmospheric transmittance of the near infrared light.

Modification of Fourth Example Embodiment

Next, a modification of the fourth example embodiment will be described. An image processing device 41 according to the modification of the fourth example embodiment is corresponding to the case that the third correction unit 44 is mounted on the image processing device 20 according to the second example embodiment.

Figure 11:
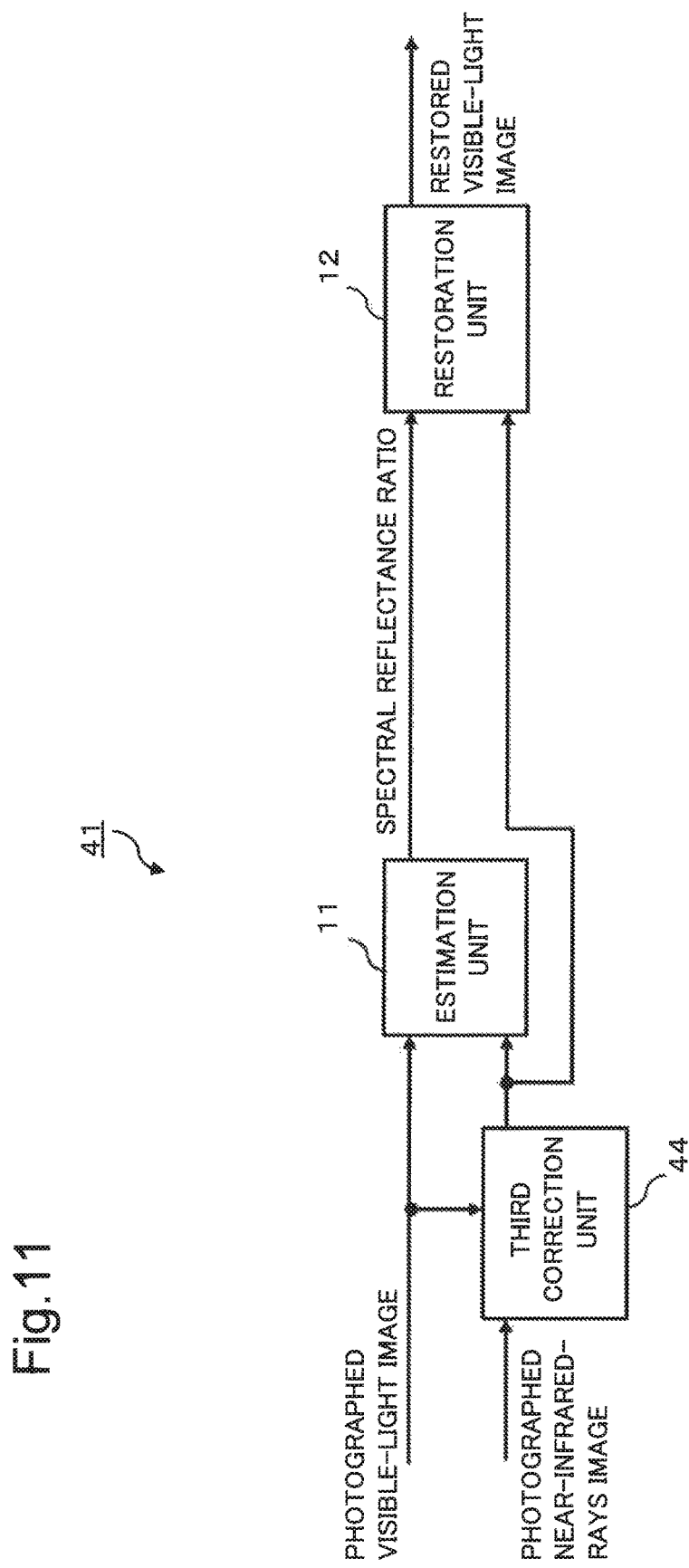
FIG. 11 is a block diagram illustrating a modification of the configuration of the image processing device according to the fourth example embodiment.

FIG. 11 is a block diagram illustrating a configuration of the image processing device 41 which is the modification of the fourth example embodiment. The image processing device 41 illustrated in FIG. 11 includes the estimation unit 11, the restoration unit 12 and the third correction unit 44.

The third correction unit 44 of the image processing device 41 receives input of the photographed near infrared image. The third correction unit 44 estimates the amount of degradation, which is due to the particles existing in the air, in the photographed near infrared image, carries out correction, which reduces degradation of the photographed near infrared image, and generates the corrected near infrared image. The correction process in which the third correction unit 44 of the image processing device 41 corrects the near infrared image is similar to the correction process which is carried out by the third correction unit 44 of the image processing device 40 according to the fourth example embodiment.

The estimation unit 11 of the image processing device 41 receives input of the photographed visible light image and the corrected near infrared image, which is provided by the third correction unit 44, and estimates the spectral reflectance ratio. The estimation process which is carried out by the estimation unit 11 of the image processing device 41 is similar to the estimation process which is carried out by the estimation unit 11 of the image processing device 31.

Figure 12:
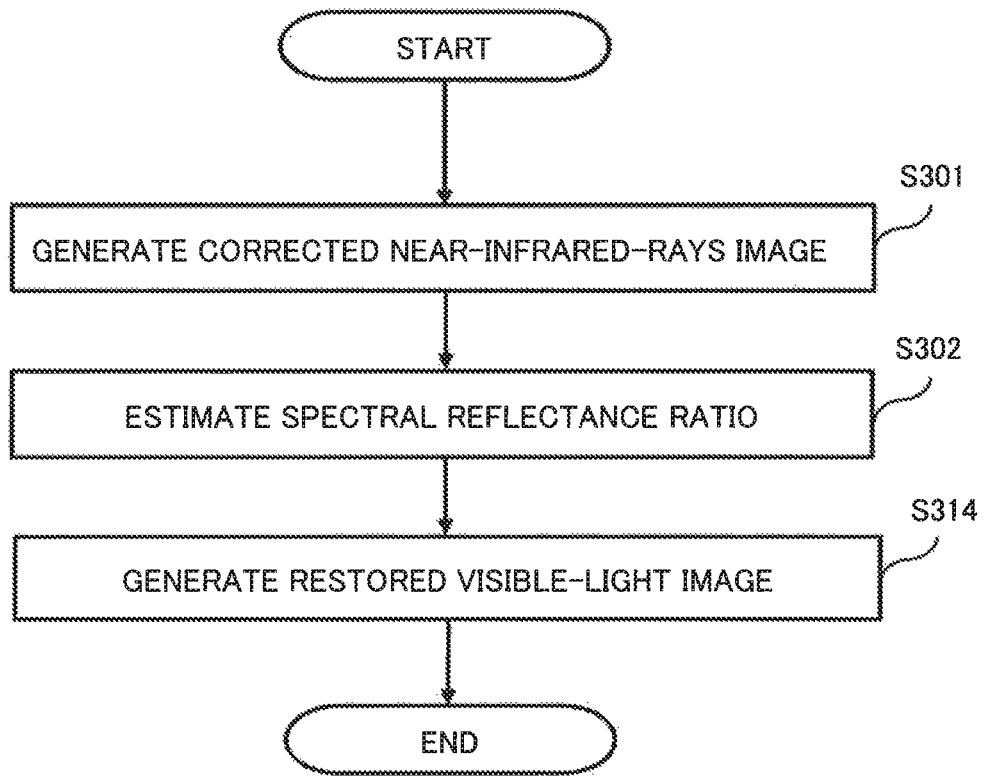
FIG. 12 is a flowchart illustrating an operation of the modification of the image processing device according to the fourth example embodiment.

The restoration unit 12 of the image processing device 41 receives input of the spectral reflectance ratio, which is provided by the estimation unit 11, and the corrected near infrared image, which is provided by the third correction unit 44, and generates the restored visible light image. In the generation process which is carried out by the restoration unit 12 of the image processing device 41, a part of the inputs into the restoration unit 12 is changed from the photographed near infrared image to the corrected near infrared image. FIG. 12 is a flowchart illustrating an operation of the image processing device according to the modification of the fourth example embodiment.

Firstly, the third correction unit 44 of the image processing device 41 receives input of the photographed near infrared image. The third correction unit 44 estimates the atmospheric transmittance, which is due to the particles existing in the air, in the photographed near infrared image, carries out correction, which reduces degradation of the photographed near infrared image, and generates the corrected near infrared image (S301).

The estimation unit 11 of the image processing device 41 receives input of the photographed visible light image and the corrected near infrared image which is provided by the third correction unit 44. The estimation unit 11 estimates the spectral reflectance ratio ratio of the object of photographing at each pixel position (S302). The spectral reflectance ratio is a ratio of the spectral reflectance of the visible light wavelength region to the spectral reflectance of the near infrared light wavelength region.

The restoration unit 12 of the image processing device 41 receives input of the corrected near infrared image, which is provided by the third correction unit 44, and the spectral reflectance ratio, which is provided by the estimation unit 11, and generates the restored visible light image (S314).

Here, the example that the third correction unit 44 is mounted on the image processing device 20 according to the second example embodiment has been described as the modification of the fourth example embodiment, but the modification is not limited to this example. For example, the second correction unit 34 of the image processing device 31, which is the modification of the third example embodiment, may be replaced with the third correction unit 44.

Effect of Modification of Fourth Example Embodiment

As in the image processing device 10 according to the first example embodiment, the image processing device 41, which is the modification of the fourth example embodiment, can eliminate the effects due to the particles existing in the air from the visible light image, in which the object of photographing is photographed, and can generate the restored image with high level quality.

Furthermore, the image processing device 41 can eliminate the effects due to the particles existing in the air from the photographed near infrared image, and can generate the restored image with high level quality in comparison with the image processing device 31 which is the modification of the third example embodiment of the restored visible light image. The reason is that the third correction unit 44 estimates the atmospheric transmittance in each pixel of the photographed near infrared image, carries out correction which reduces the degradation due to the particles existing in the air, uses the information of the photographed visible light image during these processes, thereby making it possible to improve accuracy in estimating the atmospheric transmittance of the near infrared light.

Each processing unit of the image processing device, which is described in each of the first to the fourth example embodiments, can be configured by using an integrated circuit which is hardware. It is also possible to realize a function of each processing unit by software such as an image processing program or the like, and to make a computer device carry out each processing of the image processing device.

Hardware Configuration Diagram

Figure 14:
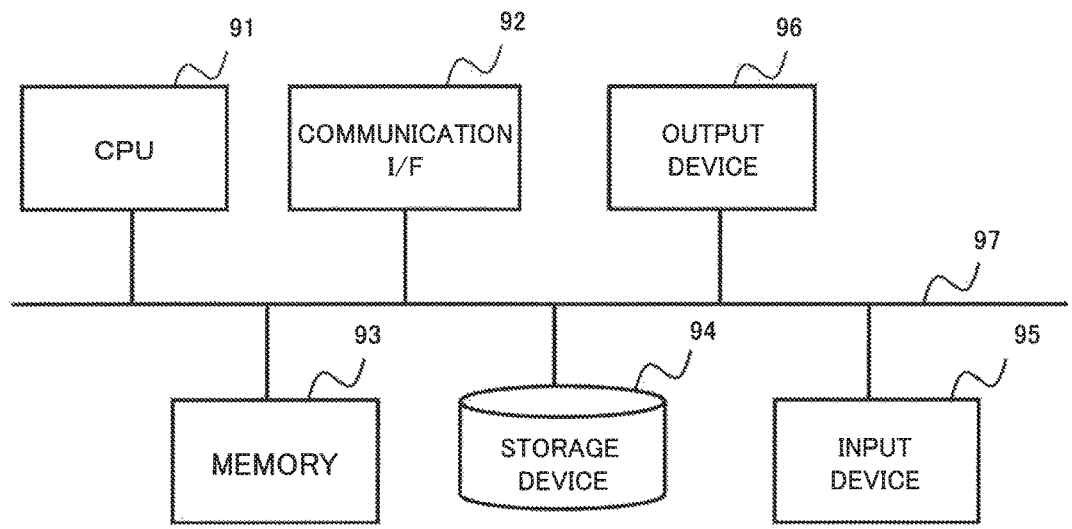
FIG. 14 is a block diagram illustrating a hardware configuration for realizing the image processing device according to each of the example embodiments 1 to 4 by using a computer.

FIG. 14 is a diagram illustrating a hardware configuration in which each of the image processing devices according to the example embodiments 1 to 4 of the disclosed subject matter is realized by a computer device. As illustrated in FIG. 14, the image processing device includes a CPU (Central Processing Unit) 91, a communication I/F (communication interface) 92 for a network connection, a memory 93, and a storage device 94, which stores a program, such as a hard disk or the like.

The CPU 91 controls each of the image processing devices according to the example embodiments 1 to 4 of the disclosed subject matter by running an operating system. Moreover, the CPU 91 reads a program and data, for example, from a recording medium which is mounted on a drive device, and writes the program and data into the memory 93.

Moreover, the CPU 91 functions, for example, at least as a part of the estimation unit 11 and the restoration unit 12 of the image processing device 10 according to the first example embodiment, and carries out various kinds of processing on the basis of the program.

The storage device 94 is, for example, an optical disk, a flexible disk, a magneto optical disk, an external hard disk, a semiconductor memory, or the like. A storage medium which is a part of the storage device is a non-volatile storage device, and stores the program. Moreover, the program is connected to a communication network. The program may be downloaded from an external computer which is not illustrated in the drawing.

The CPU 91 is connected to an input device 95 and an output device 96 through a system bus 97. The input device 95, which is realized, for example, by a mouse, a keyboard, a key button, a touch panel, or the like, is used for an input operation. The output device 96, which is realized, for example, by a display, is used for checking an output signal.

As mentioned above, each example embodiment of the disclosed subject matter is realized by the hardware configuration illustrated in FIG. 14.

However, realization means of each unit of the image processing device is not limited in particular. That is, the image processing device may be realized by a single device which is physically connected, or may be realized by a plurality of devices which are separated physically and connected each by wired or wireless connection.

While the disclosed subject matter has been described with reference to the example embodiments (including the examples) as illustrated above, the disclosed subject matter is not limited to the example embodiments (including examples). It is possible to add various changes, which those skilled in the art can understand, to the configurations and details of the disclosed subject matter within the scope of the disclosed subject matter. Moreover, while having described the first to the fourth example embodiments by using the example of the foggy weather, it is possible to apply the disclosed subject matter to the hazy or misty weather.

This application is based upon and claims the benefit of priority from Japanese Patent Application No. 2015-007204, filed on Jan. 16, 2015, the disclosure of which is incorporated herein in its entirety by reference.

A whole of, or a part of the example embodiments mentioned above can be described as, but not limited to, the following Supplementary Notes.

(Supplementary Note 1)

An image processing device includes: an estimation unit configured to estimate a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region; and a restoration unit configured to multiply an estimated spectral reflectance ratio by luminance of the near infrared image at each pixel position and generate a restored visible light image.

(Supplementary Note 2)

The image processing device according to Supplementary Note 1 further includes:

a first correction unit configured to receive input of the visible light image and the estimated spectral reflectance ratio, and calculate a corrected spectral reflectance ratio by correcting the spectral reflectance ratio of the object of photographing at each pixel of interest by use of information of the visible light image and the spectral reflectance ratio in a neighborhood around the pixel of interest, wherein the restoration unit multiplies the corrected spectral reflectance ratio by luminance of the near infrared image and generates the restored visible light image.

(Supplementary Note 3)

The image processing device according to Supplementary Note 2, wherein the first correction unit extracts pixel groups from neighborhoods around the pixel of interest, which are regarded as a same region, by using the information of the visible light image, and corrects the spectral reflectance ratio of the pixel of interest based on the spectral reflectance ratios of the pixel groups extracted.

(Supplementary Note 4)

The image processing device according to Supplementary Note 3, wherein the first correction unit smoothes a spectral reflectance ratio by using composite weight on the basis of color information of the visible light image.

(Supplementary Note 5)

The image processing device according to Supplementary Note 4, wherein as the composite weight, the hue H of the HSV color system in each pixel of the visible light image is used.

(Supplementary Note 6)

The image processing device according to any one of Supplementary Note 2 to Supplementary Note 5, wherein the first correction unit calculates a composite weight for a pixel in a predetermined neighborhood including the pixel of interest, and calculates the corrected spectral reflectance ratio by combining the spectral reflectance ratios of the pixels in the neighborhood.

(Supplementary Note 7)

The image processing device according to any one of Supplementary Note 1 to Supplementary Note 6, further includes:

a second correction unit configured to estimate an atmospheric transmittance at each pixel of the near infrared image, and correct the near infrared image by using an estimated amount of degradation, wherein the restoration unit multiplies the estimated spectral reflectance ratio by luminance of a corrected near infrared image, which is corrected by the second correction unit, and generate the restored visible light image.

(Supplementary Note 8)

The image processing device according to Supplementary Note 7, wherein the second correction unit corrects a pixel value of each the pixel of interest in the near infrared image by using a pixel value of a pixel in a neighborhood around the pixel of interest in the near infrared image.

(Supplementary Note 9)

The image processing device according to any one of Supplementary Note 1 to Supplementary Note 6, further includes:

a third correction unit configured to correct the near infrared image by using the visible light image, wherein the restoration unit multiplies the estimated spectral reflectance ratio by luminance of a corrected near infrared image, which is corrected by the third correction unit, and generates the restored visible light image.

(Supplementary Note 10)

The image processing device according to Supplementary Note 9, wherein in a case that, at a predetermined pixel in the near infrared image and the visible light image, the atmospheric transmittance of the near infrared light is lower than that of visible light, a prediction is made that there is an error in estimating the atmospheric transmittance.

(Supplementary Note 11)

An image processing method includes:

estimating a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region; and multiplying an estimated spectral reflectance ratio by luminance of the near infrared image at each pixel position and generating a restored visible light image.

(Supplementary Note 12)

A recording medium which stores a program making a computer execute:

estimating a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region; and multiplying an estimated spectral reflectance ratio by luminance of the near infrared image at each pixel position and generating a restored visible light image.

REFERENCE SIGHS LIST

10 image processing device
11 estimation unit
12 restoration unit
20 image processing device
23 first correction unit
30 image processing device
31 image processing device
34 second correction unit
40 image processing device
41 image processing device
44 third correction unit
91 CPU
92 communication I/F (communication interface)
93 memory
94 storage device
95 input device
96 output device
97 system bus

What is claimed is:

1. An image processing device comprising:
at least one memory configured to store instructions; and
at least one processor configured to execute the instructions to:
estimate a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region; and
multiply the estimated spectral reflectance ratio by luminance of the near infrared image at each pixel position and generate a restored visible light image.

2. The image processing device according to claim 1, wherein the at least one processor is to execute the instructions to further:
receive input of the visible light image and the estimated spectral reflectance ratio, and calculate a corrected spectral reflectance ratio by correcting the spectral reflectance ratio of the object of photographing at each pixel of interest by use of information of the visible light image and the spectral reflectance ratio in a neighborhood around the pixel of interest, wherein the at least one processor multiplies the corrected spectral reflectance ratio by luminance of the near infrared image and generates the restored visible light image.

3. The image processing device according to claim 2, wherein the at least one processor extracts pixel groups from neighborhoods around the pixel of interest, which are regarded as a same region, by using the information of the visible light image, and corrects the spectral reflectance ratio of the pixel of interest based on the spectral reflectance ratios of the pixel groups extracted.

4. The image processing device according to claim 2, wherein the at least one processor calculates a composite weight for a pixel in a predetermined neighborhood including the pixel of interest, and calculates the corrected spectral reflectance ratio by combining the spectral reflectance ratios of the pixels in the neighborhood.

5. The image processing device according to claim 1, wherein the at least one processor is to execute the instructions to further:

estimate an atmospheric transmittance at each pixel of the near infrared image, and correct the near infrared image by using the estimated atmospheric transmittance, wherein the at last one processor multiplies the estimated spectral reflectance ratio by luminance of a corrected near infrared image, which is corrected by the second correction unit, and generates the restored visible light image.

6. The image processing device according to claim 5, wherein the at least one processor corrects a pixel value of each the pixel of interest in the near infrared image by using a pixel value of a pixel in a neighborhood around the pixel of interest in the near infrared image.

7. The image processing device according to claim 1, wherein the at least one processor is to execute the instructions to further:

correct the near infrared image by using the visible light image, wherein the at least one processor multiplies the estimated spectral reflectance ratio by luminance of a corrected near infrared image, which is corrected by the third correction unit, and generates the restored visible light image.

8. The image processing device according to claim 7, wherein in a case that, at a predetermined pixel in the near infrared image and the visible light image, the atmospheric transmittance of the near infrared light is lower than that of visible light, a prediction is made that there is an error in estimating the atmospheric transmittance.

9. An image processing method comprising:

estimating a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region; and multiplying the estimated spectral reflectance ratio by luminance of the near infrared image at each pixel position and generating a restored visible light image.

10. A non-transitory computer-readable recording medium which stores a program making a computer execute:

estimating a spectral reflectance ratio at each pixel position in a visible light image and a near infrared image in which an object of photographing is photographed, the spectral reflectance ratio indicating a ratio of a spectral reflectance of a visible light wavelength region to a spectral reflectance of a near infrared light wavelength region; and multiplying the estimated spectral reflectance ratio by luminance of the near infrared image at each pixel position and generating a restored visible light image.

* * * * *